(12) United States Patent
Asher et al.

(10) Patent No.: US 7,774,258 B2
(45) Date of Patent: *Aug. 10, 2010

(54) SYSTEM AND METHOD FOR FORMING A FINANCIAL INSTRUMENT INDEXED TO ENTERTAINMENT REVENUE

(75) Inventors: Joseph M. Asher, New York, NY (US); Howard W. Lutnick, New York, NY (US)

(73) Assignee: BGC Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/408,370

(22) Filed: Mar. 20, 2009

(65) Prior Publication Data

US 2009/0210335 A1    Aug. 20, 2009

Related U.S. Application Data

(63) Continuation of application No. 10/914,706, filed on Aug. 9, 2004, now Pat. No. 7,567,931.

(60) Provisional application No. 60/537,325, filed on Jan. 16, 2004.

(51) Int. Cl.
*G06Q 40/00* (2006.01)

(52) U.S. Cl. ........................ 705/36 R; 705/35

(58) Field of Classification Search ................ 705/38; 707/1; 709/218; 463/25; 725/1; 235/379–380
See application file for complete search history.

(56) References Cited

U.S. PATENT DOCUMENTS

| | | | |
|---|---|---|---|
| 5,311,423 A | 5/1994 | Clark | |
| 5,946,667 A | 8/1999 | Tull, Jr. et al. | |
| 5,950,176 A | 9/1999 | Keiser et al. | |
| 6,154,730 A | 11/2000 | Adams et al. | |
| 6,260,019 B1 | 7/2001 | Courts | |
| 6,418,417 B1 | 7/2002 | Corby et al. | |
| 6,482,091 B1 | 11/2002 | Kobayashi et al. | |
| 6,505,174 B1 | 1/2003 | Keiser et al. | |

(Continued)

FOREIGN PATENT DOCUMENTS

WO        WO 01/77940        10/2001

(Continued)

OTHER PUBLICATIONS

Motion Picture Funding and Marketing Consultants—www.cine-tec.com/whatwedo/htm(Cine-Tec).*

(Continued)

*Primary Examiner*—Jim Trammell
*Assistant Examiner*—Chika Ojiaku
(74) *Attorney, Agent, or Firm*—Mark A. Miller

(57) ABSTRACT

A method for forming a securities bundle indexed to entertainment revenue includes determining a first funding amount for a first entertainment event. A second funding amount is determined for a second entertainment event. Next, a dividend schedule is determined for the first and second entertainment events. A securities bundle is formed at least partially based on the funding amounts and the dividend schedule, with the securities bundle comprising a first security and a second security. The first security is associated with the first entertainment event and the second security is associated with the second entertainment event.

42 Claims, 5 Drawing Sheets

U.S. PATENT DOCUMENTS

| | | | |
|---|---|---|---|
| 6,792,411 | B1 | 9/2004 | Massey, Jr. |
| 7,062,457 | B1* | 6/2006 | Kaufman .................... 705/35 |
| 7,174,517 | B2 | 2/2007 | Barnett et al. |
| 7,236,955 | B2 | 6/2007 | Sugahara |
| 7,263,504 | B2 | 8/2007 | Galai et al. |
| 7,340,425 | B2 | 3/2008 | Boyle et al. |
| 7,409,367 | B2 | 8/2008 | McGill et al. |
| 7,438,640 | B2 | 10/2008 | Amour |
| 2002/0019792 | A1 | 2/2002 | Maerz et al. |
| 2002/0038270 | A1 | 3/2002 | Shin et al. |
| 2002/0073021 | A1 | 6/2002 | Ginsberg et al. |
| 2002/0087447 | A1 | 7/2002 | McDonald et al. |
| 2002/0095369 | A1 | 7/2002 | Kaplan et al. |
| 2002/0152458 | A1 | 10/2002 | Eyer et al. |
| 2003/0093356 | A1 | 5/2003 | Kaufman |
| 2003/0172026 | A1 | 9/2003 | Tarrant |
| 2003/0200164 | A1 | 10/2003 | Jacobs |
| 2004/0015427 | A1 | 1/2004 | Camelio |
| 2004/0039685 | A1 | 2/2004 | Hambrecht et al. |
| 2004/0068738 | A1 | 4/2004 | Kinoshita |
| 2004/0078268 | A1 | 4/2004 | Sprogis |
| 2004/0078314 | A1 | 4/2004 | Maerz et al. |
| 2004/0088242 | A1 | 5/2004 | Asher et al. |
| 2004/0138977 | A1 | 7/2004 | Tomkins et al. |
| 2004/0143530 | A1 | 7/2004 | Galai et al. |
| 2004/0243504 | A1 | 12/2004 | Asher et al. |
| 2004/0260575 | A1 | 12/2004 | Massey, Jr. |
| 2004/0267657 | A1 | 12/2004 | Hecht |
| 2005/0010487 | A1 | 1/2005 | Weisbach et al. |
| 2005/0038706 | A1 | 2/2005 | Yazdani et al. |
| 2005/0044025 | A1 | 2/2005 | Tutty et al. |
| 2005/0071250 | A1 | 3/2005 | Weisbach et al. |
| 2005/0080705 | A1 | 4/2005 | Chaganti |
| 2005/0097022 | A1 | 5/2005 | Silman |
| 2005/0108131 | A1 | 5/2005 | Halikias |
| 2006/0173761 | A1 | 8/2006 | Costakis |
| 2006/0173764 | A1 | 8/2006 | Costakis et al. |
| 2006/0235783 | A1 | 10/2006 | Ryles et al. |
| 2006/0259312 | A1 | 11/2006 | DeTitta |
| 2006/0293985 | A1 | 12/2006 | Lederman et al. |
| 2007/0100729 | A1 | 5/2007 | Chen |
| 2007/0136074 | A1* | 6/2007 | Hahn et al. .................... 705/1 |

FOREIGN PATENT DOCUMENTS

| | | |
|---|---|---|
| WO | WO 03/100567 | 12/2003 |
| WO | WO 2005/017700 | 2/2005 |

OTHER PUBLICATIONS

C.Edward Fee, The Costs of outside Equity Control; Evidence from Motion Picture Financing Decisions, The Journal of Business, vol. 75, No. 4 (Oct. 2002), pp. 681-711 (Costs).*

Notice of Allowance for U.S. Appl. No. 10/914,528; 38 pages; Dec. 11, 2009.
Gaylord Entertainment, Warner Brothers pictures enters in to Co-Financing/production Pact, Sep. 14, 2000; Business Wire; Gaylord.
CINE-TEC Motion Picture Funding and Marketing Consultants, http://cine-tec.com/whatwedo.htm,2000 (CINE-TEC).
Notice of Allowance for U.S. Appl. No. 10/914,467; 38 pages; Jan. 28, 2010.
U.S. Appl. No. 10/914,528, filed Aug. 9, 2004, Asher et al.
U.S. Appl. No. 10/914,706, filed Aug. 9, 2004, Asher et al.
U.S. Appl. No. 10/914,467, filed Aug. 9, 2004, Asher et al.
U.S. Appl. No. 11/133,972, filed May 20, 2005, Asher et al.
Notice of Allowance for U.S. Appl. No. 11/133,972; 22 pages; Nov. 25, 2009.
Michael C. McCabe; You have now entered the Bowie Bond Era; 1997 p. 8-16; www.freddiemac.com/finance/smm/july97/pdfs/mccabe.pdf (McCabe).
"Film Venture; Funding the Next Generation of Filmmakers," Film Investors Group, (5 pgs) undated.
Lee, "Sport Marketing Strategies Through the Analysis of Sport Consumer Behavior and Factors 2000 Influencing Attendance," UMI Dissertation Services, (139 pgs) 2000.
Eng, "Producing New Opportunities," Presstime, (2 pgs) Feb. 2005.
Notification of Transmittal of the International Search Report and Written Opinion of the International Searching Authority, or the Declaration for International Application No. PCT/US2005/01276 (9 pgs), Dec. 18, 2006.
Notification of Transmittal of the International Search Report and Written Opinion of the International Searching Authority, or the Declaration for International Application No. PCT/US2006/19316 (6 pgs), Jan. 8, 2007.
Goliath Business Knowledge on Demand; Innkeepers USA Trust Announces 2001 Dividend Allocation; (1 pg) Jan. 24, 2002.
USPTO Office Action for U.S. Appl. No. 10/914,706, Feb. 21, 2008 (19 pgs).
USPTO Office Action for U.S. Appl. No. 10/914,467, Mar. 19, 2008 (25 pgs).
USPTO Office Action for U.S. Appl. No. 11/133,972, Mar. 31, 2008 (18 pgs).
USPTO Office Action for U.S. Appl. No. 10/914,528, Feb. 20, 2008 (13 pgs).
USPTO Office Action for U.S. Appl. No. 10/914,528, Apr. 20, 2009 (11 pgs).
US PTO Office Action for U.S. Appl. No. 10/914,706; 8 pages; Nov. 4, 2008.
Notice of Allowance for U.S. Appl. No. 10/914,706; 7 pages; Mar. 5, 2009.
USPTO Office Action for U.S. Appl. No. 10/914,467, Dec. 15, 2008 (14 pgs).
USPTO Office Action for U.S. Appl. No. 11/133,972, Dec. 23, 2008 (20 pgs).
Supplemental Notice of Allowability for U.S. Appl. No. 10/914,706; dated Jul. 2, 2009; 2 pages.

* cited by examiner

SYSTEM AND METHOD FOR FORMING A FINANCIAL INSTRUMENT INDEXED TO ENTERTAINMENT REVENUE

RELATED APPLICATION

The present application is a continuation of U.S. patent application Ser. No. 10/914,706, filed Aug. 9, 2004 now U.S. Pat. No. 7,567,931; which claims the benefit under 35 U.S.C. §119 of provisional application Ser. No. 60/537,325 filed Jan. 16, 2004, each of which is incorporated by reference herein in its entirety.

TECHNICAL FIELD OF THE INVENTION

This disclosure relates generally to systems and methods for financial investments. More specifically, the disclosure relates to a financial instrument indexed to entertainment revenue.

BACKGROUND OF THE INVENTION

Current entertainment companies are typically corporations or partnerships that fund, produce, or otherwise participate in the creation or organization of many entertainment events. These entertainment events normally require various amounts of funding based on a number of criteria. For example, if the entertainment event is a movie, then the level of funding may be based on the chosen director for the film, the selected actors, the special effects or Computer Generated Imagery (CGI), locations desired for the film, appropriate advertising, and many other factors. In another example, if the entertainment event is a concert, then the level of funding may be based on an arena, security at the arena, transportation costs for the performing artists, and such. Occasionally, funding for one of the events may be more difficult to obtain because of poor public or industry perception of the project, lack of information about or knowledge of the project, inaccessibility to the funding process by interested investors, possible exclusivity of the particular entertainment industry, the particular funding needs being too great for one or a few investors, or for any other reason. Once funding is obtained and the event is produced, created, hosted, or otherwise premiered, the entertainment company receives at least portion of the revenues. Typically, as in the case of movies, this portion is based on the ticket sales of the movie, less distributor fees.

SUMMARY OF THE INVENTION

In one embodiment, this disclosure provides a method for forming a securities bundle indexed to entertainment revenue. The example method includes determining a first funding amount for a first entertainment event. A second funding amount is determined for a second entertainment event. Next, a dividend schedule is determined for the first and second entertainment events. A securities bundle is formed at least partially based on the funding amounts and the dividend schedule, with the securities bundle comprising a first security and a second security and the first security associated with the first entertainment event and the second security associated with the second entertainment event.

In another embodiment, this disclosure provides a method for purchasing a securities bundle indexed to entertainment revenue. This example method includes selecting a securities bundle offered by a special-purpose entity, with the securities bundle comprising a first security and a second security and the securities bundle associated with a closing date. The first security is associated with a first entertainment event and the second security is associated with a second entertainment event. A return value is identified and associated with the securities bundle. A purchase price is identified and associated with the securities bundle. The selected securities bundle is then purchased at least partially based on the purchase price and the return value.

In yet another embodiment, this disclosure provides a method for providing an after-market for securities indexed to entertainment revenue. This example method includes identifying a securities bundle comprising a first and second security, with the first security associated with a first entertainment event and the second security associated with a second entertainment event. The first security is offered in an after-market for the buying price. A market price is determined for the first security in the after-market.

In a further embodiment this disclosure provides an electronic system for offering, purchasing, selling, trading, searching, or otherwise processing securities associated with entertainment events.

In another embodiment, a system and method is provided for trading the securities bundle that includes unbundling the securities bundle into the component securities for sales in a secondary market, such as an ECN. Moreover, futures contracts for one or more of the component securities may be traded on a futures exchange.

The invention has several important technical advantages. Various embodiments of the invention may have none, some, or all of these technical advantages. One technical advantage of the present invention is that it increases accessibility to the funding process through the use of systems architected into appropriate networks to connect investors with facilitators and those seeking to fund a project. This provides an opportunity for a wider range of investors to participate in at least some portion of the entertainment industry, whether movies, sports, music, or others. This network may also increase the reliability and accuracy of transactions, thereby increasing transaction volume. Moreover, this may provide for real-time communications among parties, thereby increasing the speed and efficiency of transaction processing. Further, the present invention may provide entertainment companies with a new source of financing for expensive or risky entertainment events. The present invention may create or allow for the creation of a secondary or after-market for the investments in the entertainment events. The present invention may also allow for a new data supplier industry responsible for compiling, storing, and providing information related to the entertainment events for investor research. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF THE DRAWINGS

Figure 1:
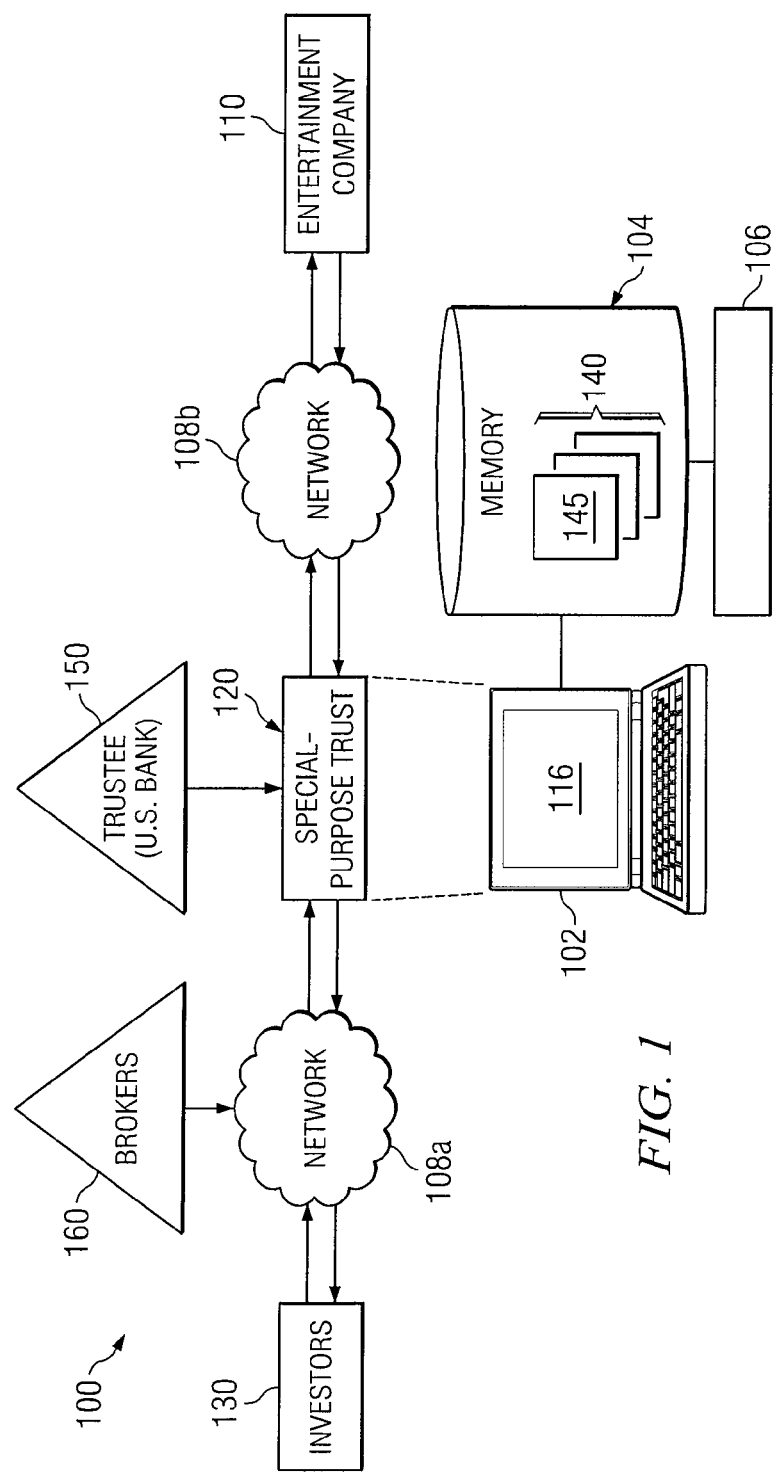
FIG. 1 illustrates an example system for offering one or more securities bundles indexed to entertainment revenue in accordance with one embodiment of the present disclosure.

FIG. 1 illustrates an example system 100 for forming, issuing, and/or offering a securities bundle 140 indexed to entertainment revenue for one or more entertainment events produced or sponsored by at least one entertainment company 110 or its affiliates in accordance with one embodiment of the present disclosure. For example, system 100 may be a financial market, electronic and/or manual, involving any portion of a life cycle of securities bundle 140. In certain embodiments, system 100 allows investors 130 to participate in a popular, yet often exclusive, industry, while attempting to receive a positive rate of return on investment. System 100 further provides a new—and reusable—source of funds for entertainment companies 110, thereby at least partially relieving those companies 110 from having to obtain alternative financing or keep a large cash reserve. In the illustrated embodiment, system 100 includes entertainment company 110, a special-purpose trust 120, and one or more investors 130. But system 100 contemplates any appropriate partial configuration such as, for example, entertainment company 110 directly offering securities bundle 140 to investors 130.

Entertainment company 110 is at least a portion of a business unit of any appropriate size that funds, produces, hosts, sponsors, presents or is otherwise financially involved in a plurality of entertainment events. Entertainment company 110 may reference any suitable business organization (including one or more divisions), corporation, partnership, individual, entity formed for the special purpose of one or more of the particular events, financial or commercial alliance among several businesses, or any subsidiary, affiliate, assignee, associate, employee, or agent thereof. For example, entertainment company 110 may be a movie studio, a music production company, a concert promoter, a sports team or league, or any other suitable company providing entertainment services or products. The entertainment events offered by entertainment company 110 (and at least partially represented in securities bundle 140) may be substantially similar, such as multiple concerts by one musical artist, or not, such as a plurality of different movies and television shows.

Investors 130 are individuals or entities qualified to participate in system 100 and to fund entertainment events offered by one or more entertainment companies 110. Generally, an investor 130 provides funds to entertainment company 110, in any appropriate manner, for the production and presentation of entertainment events by purchasing one or more securities bundles 140. For example, investor 130 may purchase securities bundles 140 from entertainment company 110 through special-purpose trust 120. Special-purpose trust 120 may provide the funds to the appropriate entertainment company 110 immediately or according to a suitable funding schedule. Once an investor 130 funds particular entertainment events associated with a securities bundle 140, the corresponding entertainment company 110 provides returns on the events to investors 130 according to a dividend schedule. In one embodiment, investor 130 may be allowed to select from a plurality of sets of bundles 140, with each set of securities bundles 140 associated with events distinct from other sets. This would allow investor 130 to select bundles 140 based on any suitable criteria such as, for example, rates of return, personal likes or dislikes, popularity, and others. Investor 130 may work through broker 160, or other similar individual or agent, to obtain additional research, knowledge, or agent-like functionality. The particular securities bundles 140 a particular investor 130 is allowed to purchase may depend upon the qualifications of the particular investor 130 within system 100.

Special-purpose trust 120 is one or more trusts, or other special-purpose entities, in which a trustee 150 or other person or entity fulfilling similar functions is interjected between investors 130 and entertainment company 110 for the execution of various entertainment financing purposes. Trustee 150 normally acts in the interest of investors 130. For example, trustee 150 may be a U.S. bank or other similar entity suitable to act in such a capacity. In one embodiment, special-purpose trust 120 may represent a plurality of separate trusts, with each trust associated with one entertainment company 110. Each trust may be registered pursuant to a registration statement filed with the U.S. Securities and Exchange Commission (SEC), with special-purpose trust 120 possibly registered as an investment company. In another embodiment, special-purpose trust 120 may be one trust associated with a plurality of entertainment companies 110. Regardless of the particular configuration or embodiment of the trust, special-purpose trust 120 generally raises funds for entertainment company 110 through the issuance of securities bundles 140.

A securities bundle 140 generally comprises any financial instrument the value of which is indexed to at least a portion of the entertainment revenue generated by one or more constituent entertainment events offered by an entertainment company 110. Each securities bundle 140 typically includes a plurality (or bundle) of securities 145. However, this disclosure contemplates that securities bundle 140 may include any other suitable security, trust certificate, or any other instrument, or any combination thereof. Accordingly, the use of "securities" is for illustrative purposes only and should not be considered a limiting embodiment of the present disclosure. Return on each of the bundled securities 145 is indexed to revenues from particular entertainment events as described in greater detail below.

All securities 145 forming part of the same securities bundle 140 are associated with events at least partially occurring (e.g., produced and/or presented) during a predetermined time period. This predetermined time period may be defined by, for example, a closing date and one or more dividend dates. It will be understood that each date may be a "hard" date, such as a specific calendar date, or a "soft" date, such as a certain amount of time after a relevant event begins or ends. Moreover, there may be multiple dividend dates for multiple securities 145, thereby providing a tiered investment. According to certain embodiments, entertainment company 110 may bundle securities 145 for many entertainment events during the set timeframe, thereby potentially diversifying risk and reducing volatility. Moreover, securities 145 for entertainment events offered by different entertainment companies 110 may be bundled in the same securities bundle 140. These entertainment companies 110 may be from the same or different entertainment industries. Each issuance may also be underwritten by brokers 160.

Proceeds from the issuance of securities 145 are paid to entertainment company 110, in accordance with a specified schedule based on any appropriate criteria, under a series of swaps, or other financial arrangements, entered into by special-purpose trust 120. Each swap entitles special-purpose trust 120 to receive a specified portion of the entertainment revenues from a particular event forming part of securities bundle 140. The revenues will typically derive from primary revenues such as, for example, company net profits from ticket sales, record sales, and others. However, the disclosure contemplates an alternative or supplemental source of secondary revenues as well, including video or DVD sales, basic or premium television, merchandising, licensing, international box office sales, and such.

In one embodiment, investment system 100 illustrated above is an electronic, communicably-coupled system distributed over network 108. Network 108 facilitates wireless or wireline communication between various components of the networked system. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Indeed, while illustrated as two networks, 108*a* and 108*b* respectively, network 108 may comprise any suitable number and combination of sub-networks without departing from the scope of this disclosure, so long as at least portion of network 108 may facilitate communications between computers 102, or any other suitable network devices.

One or more of the illustrated participants of system 100 may be or include a computer 102. For example, though computer 102 is illustrated as being associated with special-purpose trust 120, a plurality of computers 102 may be associated with entertainment company 110, investors 130, or other illustrated or non-illustrated participants, or any combination thereof. At a high level, as used in this document, the term "computer" is intended to encompass a personal computer, server pool, workstation, server, network computer, personal data assistant (PDA), dumb terminal, cell phone, pager, text message device, mainframe, or any other suitable data processing device. Moreover, "computer" and "user of computer" may be used interchangeably, as appropriate, without departing from the scope of this disclosure. In other words, investors 130, brokers 160, and/or employees of entertainment company 110 or trustee 150 may each be associated with a computer 102. The computer 102 may execute any operating system including UNIX, Windows, Linux, and others. The present disclosure contemplates computers other than general purpose computers as well as computers without conventional operating systems. Further, the computer 102 may include and/or execute unique software, hardware, firmware, or other logical components designed specifically for communications involving the purchase, issuance, or sale of securities bundles 140. For example, the components may be written in any appropriate computer language including C, C++, Java, Visual Basic, and others. Further, the components may be a single multi-tasked module or multiple modules. Further, the components may include features and functionality operable to implement any technique within the scope of this disclosure. In other words, such components may be developed, modified, or produced specifically for financial applications involving securities bundles 140.

Computer 102 may include a graphical user interface (GUI) 116, which comprises, at least, a graphical user interface operable to allow the user of the computer to interact with one or more processes executing on the computer. Generally, GUI 116 provides the user of the computer with an efficient and user-friendly presentation of data employed in order to initiate transactions or to perform asset-monitoring functions within an investment system. GUI 116 may comprise a plurality of displays having interactive fields, pull-down lists, and buttons operated by the user. In one example, GUI 116 presents an explorer-type interface and receives commands from the user. In another example, GUI 116 comprises a screen on a cell phone operable to present the phone user with data. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information and efficiently presents the information to the user. Network 108 can accept data from the user of the computer via the web browser (e.g., Microsoft Internet Explorer or Netscape Navigator) and return the appropriate HTML, Java, or eXtensible Markup Language (XML) responses. The computer may also include an interface card (not illustrated) for communicating with other computer systems over network 108 such as, for example, in a client-server or other distributed environment. Generally, the interface card in computer 102 comprises logic encoded in software and/or hardware in a suitable combination and operable to communicate with the network. More specifically, the interface card may comprise software supporting one or more communications protocols and network hardware operable to communicate physical signals.

The computer may also include memory 104, which is any memory, hard drive, or database module, any of which may take the form of volatile or non-volatile memory including, without limitation, magnetic media, optical media, random access memory (RAM), read-only memory (ROM), removable media, or any other suitable local or remote memory component. Memory 104 may include any suitable data or module or not include the illustrated elements without departing from the scope of this disclosure. For example, memory may include logical representations of physical securities 145 for storing appropriate information associated with a securities bundle 140, the associated entertainment events, or other data. In another example, securities 145 may be logical data structures stored in memory 104. The computer may also include one or more processors 106 for executing instructions and manipulating data, such as data inputs and outputs, to perform the operations of computer 102 and local or remote software modules. It will be understood that reference to "processor" is meant to include multiple processors where applicable.

System 100 has several important technical advantages. One technical advantage of system 100 is that it increases accessibility to the finding process through the use of computers 102 architected using networks 108 to connect investors with facilitators and those seeking to find a project. This provides an opportunity for a wider range of investors to participate in at least some portion of the entertainment industry, whether movies, sports, music, or others. This may also increase the reliability and accuracy of transactions, thereby increasing transaction volume. Moreover, this may provide for real-time communications among parties, thereby increasing the speed and efficiency of transaction processing.

In one aspect of operation, entertainment company 110 first determines the appropriate timeframe for funding entertainment events using a securities bundle 140. For example, this may include determining an expected closing date and one or more dividend dates for a securities bundle 140. One or more entertainment events to be produced and/or presented by the entertainment company 110 during this timeframe may be included in the securities bundle 140. Each such event corresponds with a security 145 in the securities bundle 140. In another example, entertainment company 110 selects and includes within a particular securities bundle 140 a fixed number of entertainment events to be funded.

Next, entertainment company 110 determines a funding amount for each of the entertainment events within the securities bundle 140. This funding amount may be a portion or all of the amount required to fund the production and/or presentation of a corresponding entertainment event. Entertainment company 110 then associates at least a portion of the finding amount with securities bundle 140. The entertainment company 110 may also establish a suitable return value for the securities bundle 140. The return value associated with a security bundle 140 may be a percentage, a dollar value, or any other suitable algorithm for determining the rate of return on a securities bundle 140. The return value and the purchase price for securities bundle 140 are determined based on the overall design process, including potential investors' 130 demand and willingness to pay for a portion of the expected revenue for the plurality of entertainment events.

Entertainment company 110 may also establish a suitable dividend schedule for the securities bundle 140. The dividend schedule may include one or more dividend dates. In one embodiment, the first dividend date may involve the investor 130 receiving a distribution indexed to the net revenue of first run U.S. sales associated with one or more relevant entertainment events. For example, the investor 130 holding security 145 indexed to a particular movie may receive a portion of the "rent," generally considered to be the net revenue of first run U.S. box office sales received by the movie studio for the movie after the distribution fees (i.e., exhibitor fees) have been paid. Each subsequent dividend date may involve proceeds indexed to the net revenues (or other secondary revenues) from the prior dividend date to the instant one. Moreover, each security 145 may provide non-financial—as well as financial—rewards such as, for example, on-set visitation rights, attendance at a movie premier, screening opportunities, preferred seating, admission on opening day, and others. The dividends may be determined in conjunction with the corresponding dividend dates.

As described above, securities bundle 140 includes a plurality of securities 145, with each security 145 associated with one entertainment event. For example, if a movie company desires 100 million dollars to fund the production of five movies, five securities 145 (one for each movie) will be included in securities bundle 140. The example movie company may then seek to raise the 100 million dollars by selling any suitable number of securities bundles 140. The details of the securities bundles 140 are provided to special-purpose trust 120, which then offers securities bundle 140 to one or more investors 130 for purchase.

As appropriate, investor 130 selects a securities bundle 140 for purchase. Investor 130 may select securities bundle 140 using any criteria including expected purchase value, personal preferences, financial data, participants in the associated entertainment events, and/or others. In certain embodiments, entertainment company 110 may offer a discount to an investor 130 on the purchase price of a security bundle 140. This discount may be based on loyalty points earned by the investor 130 in association with entertainment events offered by entertainment company 110. For example, an investor 130 may accumulate loyalty points based on purchasing tickets to entertainment events offered by entertainment company 110. These loyalty points may operate as credits towards the purchase of subsequent security bundles 140 offered by that company 110. The loyalty points may be validated as having been earned by the investor 130 via, for example, a credit card number used to purchase prior tickets, a validated bar code on a ticket stub, or any other validation technique.

Investor 130 may then purchase the securities bundle 140 based, at least in part, on the purchase price. In a particular embodiment, the investor 130 holds the securities bundle 140 until at least the first dividend date. Once the first dividend date is reached, the negotiated return values for the component securities 145 are used to calculate the proceeds or dividends distributed to the investor 130. In particular, the dividends are calculated by based at lest in part upon the determined revenue for an associated entertainment event and the negotiated return value for a corresponding security 145. For example, where the return value is a percentage, the dividend may be determined by multiplying the determined revenue by the negotiated return value. Typically, this return value is indexed to the net revenue (or "rent") of entertainment company 110 for the entertainment event associated with security 145. Returning to the example movie company, the return value may be indexed to the domestic box office receipts for one or more of the five movies up to the first dividend date. In certain circumstances, an investor 130 may sell all or a portion of a securities bundle 140 before and/or after the first dividend date.

Additional dividends may be paid to the holder of any given securities bundle 140 according to the remainder of the dividend schedule. The dividend schedule may terminate according to a milestone associated with a particular entertainment event in the bundle 140. For example, the dividend schedule may terminate a period of time after each movie is no longer being presented in a specified number of theaters, after each movie has been considered for the Academy Awards, or after any other suitable milestone event for the movie.

Figure 2:
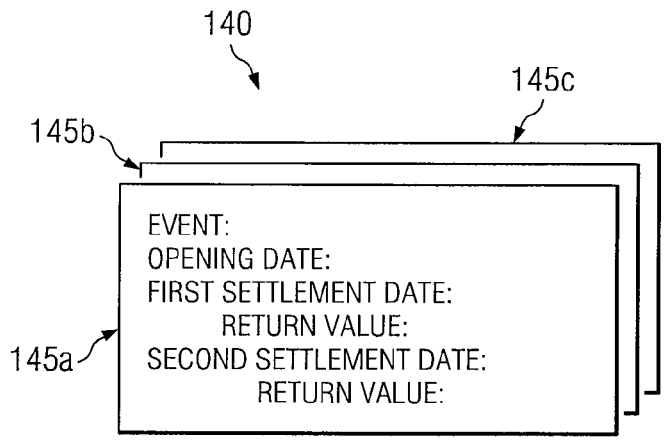
FIG. 2 is a high-level view of one embodiment of the securities bundle offered by the system in FIG. 1.

FIG. 2 illustrates an example securities bundle 140 in accordance with one embodiment of the present disclosure. Illustrated bundle 140 includes three securities 145*a*, 145*b*, and 145*c*, respectively. Each security 145 includes an associated entertainment event, an opening date and/or closing date of the event, and one or more dividend dates associated with a dividend schedule. For example, first security 145*a* includes a first dividend date associated with a first return value and a second dividend date associated with a second return value. As described above, first dividend date often follows the opening or premiere date, thereby allowing a first timeframe for determining returns on the event based, at least in part, on the first return value. Also, the second dividend date typically follows the first dividend date and is associated with a second return value. Each of second security 145*b* and third security 145*c* is associated with different entertainment events and may include similar dividend dates and return values. But this disclosure contemplates that second and third security 145*b* and 145*c* may have different dividend dates and return values from each other and first security 145*a*.

Figure 3:
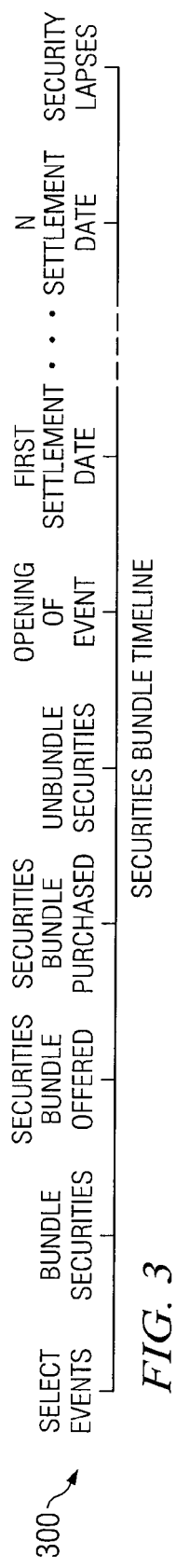
FIG. 3 illustrates an example timeline of a securities bundle in accordance with one embodiment of the present disclosure.

FIG. 3 illustrates an example timeline 300 of a securities bundle 140 in accordance with one embodiment of the present disclosure. Illustrated timeline 300 begins when a plurality of entertainment events are selected by entertainment company 110. For example, entertainment company 110 may select events at least partially occurring (e.g., produced and/or presented) within a predetermined period of time, or by using any other appropriate selection technique. Once selected, each event is associated with a security 145 and bundled into securities bundle 140. Securities bundle 140 is then offered to investors 130, typically through special-purpose trust 120. After any appropriate amount of negotiations or commercial discussions, one or more investors 130 purchases one or more securities bundles 140. In one embodiment, securities bundle 140 remains bundled throughout the dividend schedules of each component security 145. In alternative embodiments, securities bundle 140 may be unbundled into its component securities 145 at any suitable time. For example, securities bundle 140 may be automatically unbundled at the moment of purchase. In another example, securities bundle 140 may be unbundled at the first opening date or premiere of an associated entertainment event.

Each security 145 of a securities bundle 140 typically follows an particular path. For example, the entertainment event associated with a first security 145 premieres. As described above, this may be the premier of a movie, a first concert in a tour, or any other suitable opening. The next substantive date in the life of each security 145 is the first dividend date. The first dividend date is normally a predetermined time after the opening or premier of the event and is used to determine a first return for investors 130 using the associated first rate of return. For example, first dividend date may occur one hundred days after the premier of the associated movie. After the first dividend date, there may be any number of future dividend dates (including zero) for determining subsequent returns using the same, similar, or different rates of return. Once the final dividend date has occurred and the final returns have been calculated and provided, security 145 lapses.

Figure 4:
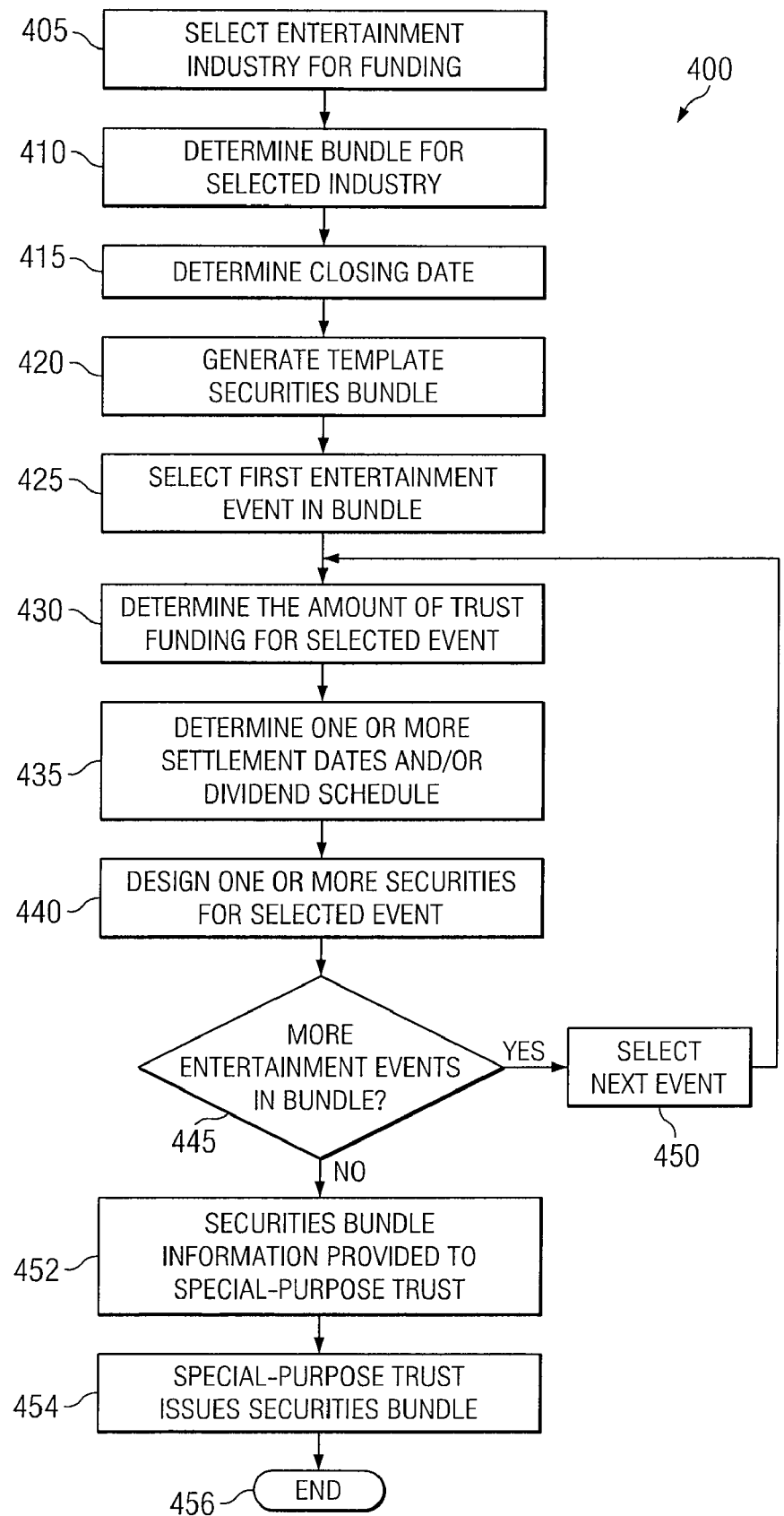
FIG. 4 illustrates an example method for forming a securities bundle indexed to entertainment revenue in accordance with one embodiment of the present disclosure.

FIG. 4 is a flowchart illustrating an example method 400 for creating or otherwise forming a securities bundle 140 that includes a plurality of securities 145 indexed to particular entertainment events in accordance with one embodiment of the present disclosure. Generally, method 400 describes an example technique, in which one or more entertainment companies 110, and other possible participants, forms securities bundle 140 to be indexed to entertainment revenue of certain entertainment events offered by the one or more entertainment companies 110. System 100 contemplates using any appropriate combination and arrangement of logical or physical elements or participants implementing some or all of the described functionality.

Method 400 begins at step 405, where entertainment company 110 selects the particular entertainment industry for funding. For example, entertainment company 110 may comprise a multimedia company with a plurality of entertainment subsidiaries for various types of entertainment events. Next, at step 410, entertainment company 110 determines a bundle 140 for the selected industry. Entertainment company 110 then determines an expected closing date for bundle 140 at step 415. A securities bundle template is then generated at step 420. Once the generic or empty securities bundle 140 has been generated or otherwise determined, entertainment company 110 then adds a plurality of entertainment events to the particular securities bundle 140 in steps 425 through 455.

At step 425, entertainment company 110 selects a first entertainment event for bundle 140. Next, entertainment company 110 determines the amount of funding desired for the selected event, at step 430. The funding amount comprises at least a portion of the cost for financing the entertainment event. Next, at step 435, entertainment company 110 determines one or more dividend dates and/or a dividend schedule for the particular security 145. Once the various parameters have been determined, entertainment company 110 compiles these parameters and designs one or more securities 145 or trust certificates for the selected event, at step 440. Next, at decisional step 445, entertainment company 110 determines if there are more entertainment events to be added to securities bundle 140. If there are more events to be bundled, then entertainment company 110 selects the next event at step 450 and method 400 returns to step 430. Once there are no more entertainment events to be bundled, entertainment company 110 provides the securities bundle 140 to special-purpose trust 120 at step 452, which then issues securities bundle 140 and the component securities 145 at step 454. The method terminates at step 456.

Figure 5:
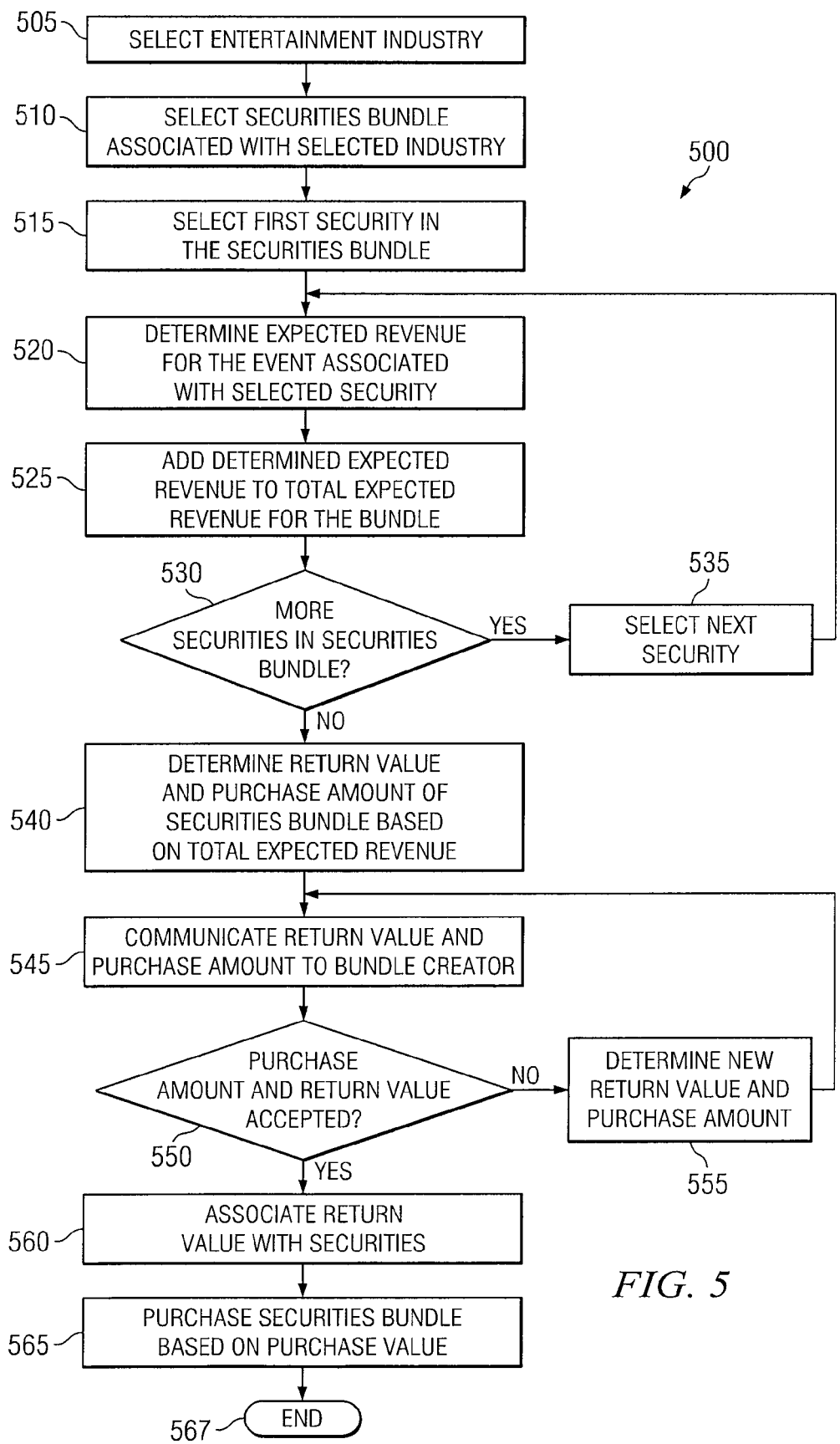
FIG. 5 illustrates an example method for purchasing a securities bundle indexed to entertainment revenue in accordance with one embodiment of the present disclosure.

FIG. 5 is a flowchart illustrating an example method 500 for purchasing or offering a securities bundle 140, which includes a plurality of securities 145 indexed to particular entertainment events in accordance with one embodiment of the present disclosure. At a high level, method 500 describes an example technique that includes selecting an offered securities bundle 140 and purchasing the selected bundle 140 for a market determined price. In one embodiment, method 500 begins once the special-purpose trust 120 has obtained the information for the formation of one or more securities bundles 140 from entertainment company 110. As with the previous flowchart, system 100 contemplates using any appropriate combination and arrangement of logical or physical elements implementing some or all of the described functionality.

Method 500 begins at step 505, where investor 130 selects an entertainment industry that he is interested in funding or otherwise financially participating in. Next, at step 510, investor 130 selects a particular securities bundle 140 associated with the selected industry. Investor 130 then selects a first security 145 in the selected securities bundle 140 at step 515. Next, an expected revenue for the event associated with the selected security 145 is then determined at step 520. The determined expected revenue is added to a total expected revenue for the selected bundle 140 at step 525. It will be understood that the total expected revenue is illustrative of merely one technique for determining the total return that investor 130 may expect from selected securities bundle 140.

Next, at decisional step 530, investor 130 determines if there are more securities 145 in securities bundle 140. If there are more securities 140, then investor 130 selects the next security 145 at step 535 and method 500 returns to step 520. Once there are no more securities 145 in securities bundle 140, then investor 130 determines a return value and a purchase amount of securities bundle 140 based, at least in part, on the determined total expected revenue at step 540. Next, at step 545, investor 130 communicates the determined return value to the bundle creator, such as entertainment company 110. Investor 130 typically also communicates the desired or expected purchase amount of selected securities bundle 140. If a communicated purchase amount and return value are not accepted by entertainment company 110 or special-purpose trust 120 then investor 130 determines a new return value and purchase amount at step 555 and method 500 returns to step 545. Once the purchase amount and return value have been successfully negotiated, then the return value is associated with the particular securities 145 at step 560. Next, at step 565, investor 130 purchases securities bundle 140 based on the accepted purchase value. The method terminates at step 567.

The preceding flowcharts and accompanying description illustrate only exemplary methods 400 and 500. In short, system 100 contemplates using any suitable technique for performing these and other tasks. Accordingly, many of the steps in these flowcharts may take place simultaneously and/or in different orders than as shown. Moreover, system 100 may use methods with additional steps, fewer steps, and/or different steps, so long as the methods remain appropriate.

Figure 6:
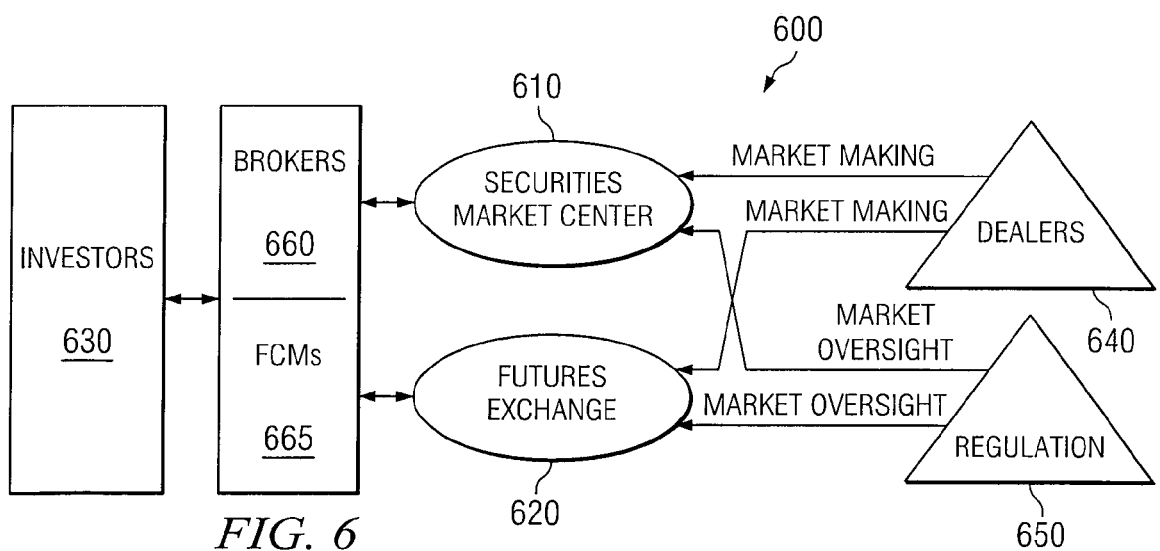
FIG. 6 illustrates an example after-market system for offering futures or secondary market transactions based on the securities bundles initially offered in the system of FIG. 1.

FIG. 6 illustrates an example after-market system 600 for offering futures or secondary market transactions based on the securities bundles 140 initially offered in the system of FIG. 1. Following each initial offering, securities bundle 140 may be automatically or manually split or unbundled into the component securities 145, which may be individually traded through after-market 600, such as a market center 600 (or "secondary market") or futures exchange 620. System 600 includes any suitable number and combination of processing and memory devices used to perform the features and functions described herein. System 600 increases the accessibility of market participants to the trading of securities bundles 140 and/or component securities 145.

According to certain embodiments, the securities 145 may be available for trading in the secondary market after the closing date or purchase date. The secondary market may include a market center 610, such as an electronic communications network (ECN) or Automated Trading System (ATS). Each securities market center 610 comprises all manner of order execution venues including exchanges, ECNs and ATSs. Each market center 610 maintains a bid and offer price in a given security 145 by having participants that stand ready, willing, and able to buy or sell at publicly quoted prices, also referred to as market center prices. Each market center 610 provides market center prices for particular securities 145. For example, a first market center may offer a particular bid price and/or offer price for particular securities 145, while another market center may offer a different bid price and/or offer price for the same securities 145. Certain market centers 610 may also charge a transaction cost in order to execute a trading order. Each market center 610 may also have different policies regarding the disclosure to market makers of various details of a trading order, such as, for example, the size of a trading order. Market center 610 may be customized or otherwise tailored to the entertainment industry or particular events. For example, the trading of a security 145 may be halted once an underlying entertainment event substantially begins, such as the opening weekend for a movie.

According to certain embodiments, the secondary market may also include dealers 640, regulators 650, brokers 660, and investors 630. Dealers 640 generally act as market-makers in both the market center and the futures exchange. Regulatory service providers 650 may provide surveillance of and other market oversight services to one or both example markets. Broker 660 may be any securities broker. Broker 660 may supply any suitable data involving a security 145 to a potential investor, and may facilitate the trading of securities 145 within system 600.

Futures contracts (or. options on futures contracts) on each security 145 may also be listed on a futures exchange 620, for example the Cantor Exchange (CX), or other trading facility to enhance liquidity in the market for one or more securities 145. Futures exchange 620 may be registered with the Commodity Futures Trading Commission (CFTC). Generally, a futures contract is an agreement to buy or to sell an asset such as, for example, a loan, currency, commodity or any suitable financial instrument (e.g., a securities bundle 140, any underlying securities 145, or a right to payment based upon an entertainment event) at some time in the future, whereby the price of the asset is agreed upon at the time the agreement is made. Unlike a stock, which represents equity in a company and an asset that can be held for an indefinite time, the futures contract normally has a finite life. The futures contract can be used for hedging price-fluctuation risks or for taking advantage of price movements, rather than for the buying or selling of the actual asset.

In one embodiment, parties to a futures contract can agree on a fixed purchase price to buy the right to a payment that is indexed to some quantifiable parameter associated with an underlying entertainment event. For example, a first party could sell to a second party a futures contract in the right to a $1 payment per each $1 million of revenue earned by an underlying entertainment event. If the futures contract was sold for $50 and the entertainment event earned $55 million upon the settlement date, then the second party would have netted $5 from the first party. If the futures contract was sold for $50 and the entertainment event earned $45 million upon the settlement date, then the first party would have netted $5 from the second party. Of course, the values used in this example could vary. Moreover, the right to payment could be associated with any other quantifiable parameter associated with the underlying entertainment event during any suitable period of time (e.g., the number of seats sold to a particular movie at a particular theater; the number of showings of a particular movie; the number of theaters in which a particular movie was shown; the number of days that a particular movie was shown; revenue at a particular theater for a particular movie; etc).

In another embodiment, parties to a futures contract can agree on a fixed purchase price to buy a securities bundle 140 or any underlying securities 145 at the expiration of the contract. For example, the seller of this futures contract can agree to sell a securities bundle 140 or any underlying securities 145 to the buyer at expiration at the fixed sales price. As time passes, the contract's value changes relative to the fixed price at which the trade was initiated according to the value of the underlying securities bundle 140 or any underlying securities 145. This creates profits or losses for the traders. In most cases, delivery of the securities bundle 140 or the underlying securities 145 associated with the futures contract does not take place. Rather, the contract is cash-settled based upon, for example, the purchase price and the value of the underlying securities bundle 140 or securities 145 at the time of settlement.

In still other embodiments, parties may offer to take a position on the outcome of various events associated with an underlying entertainment event. For example, a first party may offer to take the position that a particular movie will gross over $50 million by the first dividend date. A counterparty may offer to take the position that the particular movie will not gross over $50 million by the first dividend date. A third party intermediary may accept both offers, settle the transaction, and pay the profits on the transaction according to a fixed mathematical calculation less a suitable commission (i.e., a return of 11 to 10 on a relatively even proposition). The fixed return determined for any particular transaction may be established by the third party intermediary according to the perceived likelihood of the event occurring. The third party intermediary may be any suitable participant in system 600.

System 600 may also include futures commission merchants 665 that are involved in the solicitation or acceptance of commodity orders for future delivery of commodities related to the futures contract market. A futures commission merchant 665 is able to handle futures contract orders as well as extend credit to customers wishing to enter into such positions. These include many of the brokerages that investors in the futures markets deal with.

Data related to the securities 145 or the associated futures contracts may be provided to potential investors 630 via a third-party data supplier (not illustrated). This data supplier may compile detailed information for the entertainment event, such as trading data, from a variety of sources. The details may include financial information such as current cost of production, current gross revenues, revenues per theater, dividends, and other fiscal data relevant to investing in a particular film. The details may also include non-financial information such as, for example, filming locations, genre, the director, actors, producers, and other persons or entities involved in the production of the example film, and other suitable industry data. In short, the third-party data supplier may provide any appropriate information to enable the potential investor to tailor a trade order based on certain financial and/or non-financial criteria.

Figure 7:
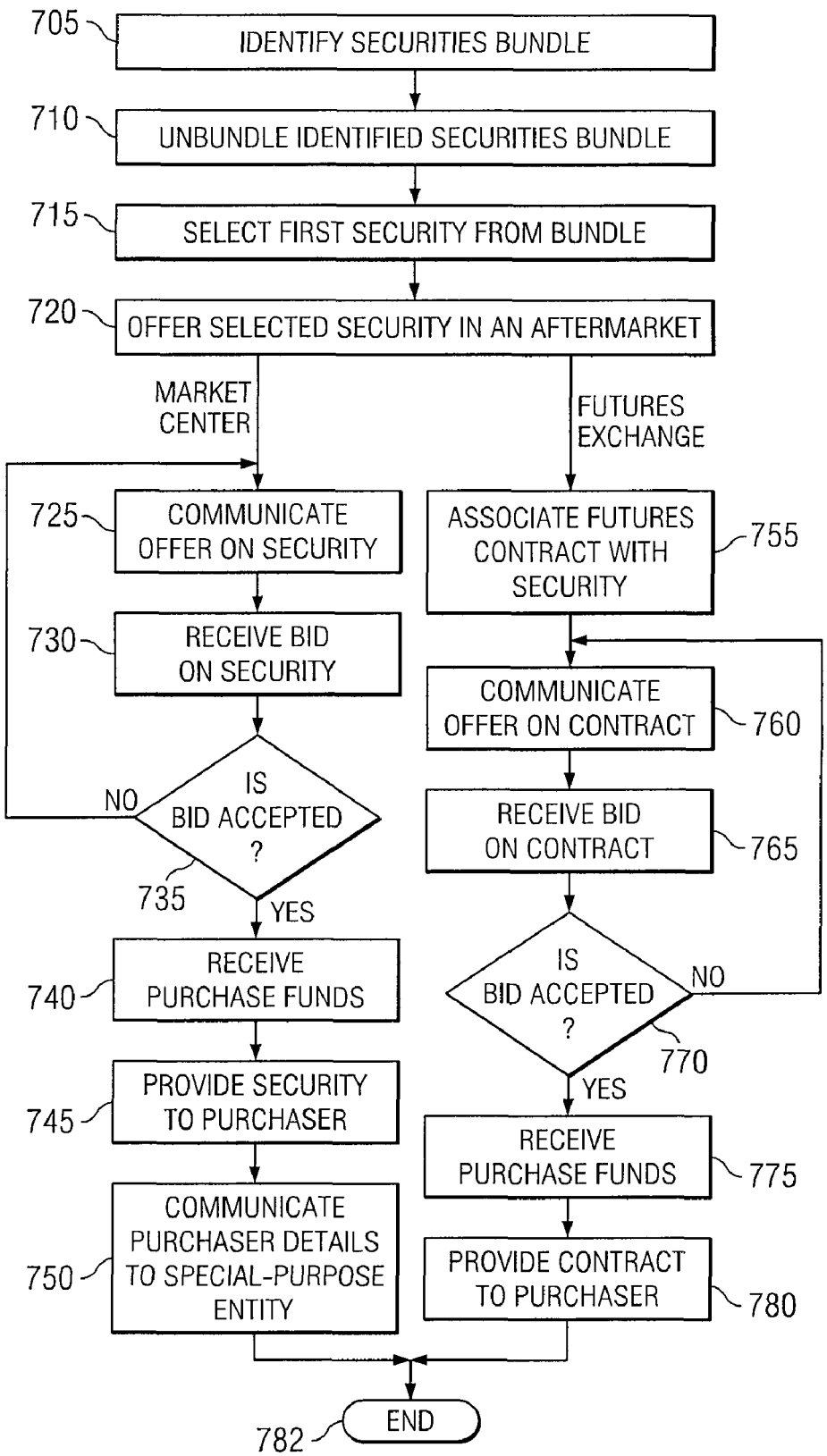
FIG. 7 illustrates an example method for transacting a security from a securities bundle in an after-market according to one embodiment of the present disclosure.

FIG. 7 illustrates an example method 700 for transacting a security 145 from securities bundle 140 in an after-market 600 according to one embodiment of the present disclosure. Generally, method 700 describes an example technique, in which investor 130 selects one or more securities 145 from securities 140 and individually offers the selected securities 145 in market center 610 and/or futures exchange 620. After-market 600 contemplates using any appropriate combination and arrangement of logical elements or players implementing or utilizing some or all of the described functionality. In short, after-market 600 contemplates using any suitable technique for performing these and other tasks. Accordingly, many of the steps in the following flowchart may take place simultaneously and/or in different orders than as shown. Moreover, after-market 600 may use methods with additional steps, fewer steps, and/or different steps, so long as the methods remain appropriate.

Method 700 begins at step 705, where a securities bundle 140 is identified. At step 710, the identified securities bundle 140 is automatically, dynamically, logically, or otherwise unbundled. Next, at step 715, investor 130 selects first security 145 from securities bundle 140. Investor 130 then offers the selected security in a particular after-market at step 720. It will be understood that this offer does not have to be binary. For example, investor 130 may offer the selected security through market center 610, while concurrently negotiating a futures contract through futures exchange 620.

If the selected security 145 is offered through market center 610, then negotiation and purchasing techniques may be utilized. For example, investor 130 may communicate an offer on the particular security 145 at step 725. Based on this offer, investor 130 may receive a bid on the particular security 145 at step 730. If investor 130 does not accept the bid at decisional step 735, then method 700 returns to step 725, where investor 130 may communicate the same or different offer on the particular security 145. Once the bid is accepted, investor 130 receives the purchase funds from the purchaser at step 740. Investor 130 then provides the particular security 145 or any representation or data thereof to the purchaser. Next, at step 750, the purchaser details are communicated to special-purpose trust 120 for subsequent dividend and returns.

Alternatively or in combination, the selected security 145 may be offered through a futures exchange. In this case, the securities bundle 140 or any underlying security 145 is associated with a potential futures contract at step 755. Next, at step 760, investor 130 communicates an offer on the futures contract. At step 765, investor 130 may receive a bid on the futures contract based on the communicated offer. If investor 130 does not accept the bid at decisional step 770, then method 700 returns to step 760. Once an agreement is reached on the futures contract associated with a particular security 145, then investor 130 receives the purchase funds at step 775. The futures contract is then provided to the purchaser at step 780. The method terminates at step 782.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A machine-implemented method for purchasing a securities bundle, the method comprising:
receiving, by the machine, an indication of a securities bundle being offered for sale, in which the securities bundle comprises a first security and a second security, in which the first security is associated with a first entertainment event, in which the second security is associated with a second entertainment event;
receiving an indication of a dividend schedule for the first and second entertainment events, in which the dividend schedule includes at least one of a date relative to consideration for an award for at least one of the first entertainment event and the second entertainment event and a date relative to a reduction to a number of venues in which at least one of the first entertainment event and the second entertainment event remains available;
receiving, by a processor of the machine, a selection of the securities bundle for purchase; and
transmitting, by the machine, a request to purchase the securities bundle through a communication network to a remote device.

2. The method of claim 1, in which the indication identifies a return value on the securities bundle.

3. The method of claim 1, in which the indication identifies a purchase price on the securities bundle.

4. The method of claim 1, in which the securities bundle is associated with a payment of a dividend based on revenue associated with at least one of the first entertainment event and the second entertainment event between a closing date of the securities bundle and at least one date of the dividend schedule.

5. The method of claim 4, in which the first entertainment event comprises a movie and the payment is determined based on revenue at least partially based on domestic ticket sales of the movie.

6. The method of claim 4, in which the first entertainment event comprises a concert and the payment is determined based on revenue at least partially based on ticket sales of the concert.

7. The method of claim 4, in which the dividend schedule includes at least one second date and in which the securities bundle is associated with at least one second dividend payment associated with second revenue from at least one of the first and second entertainment event occurring between the at least one date and the at least one second date.

8. The method of claim 7, in which the second revenue is based on at least one of video sales; merchandising; licensing; and international ticket sales.

9. The method of claim 1, in which the dividend schedule identifies at least one payment associated with net profit of at least one entertainment company.

10. The method of claim 1, further comprising obtaining a non-financial dividend in conjunction with owning the securities bundle.

11. The method of claim 10, in which the first entertainment event is associated with a movie and the non-financial dividend comprises at least one of: a screening opportunity of the movie; preferred seating at a viewing of the movie; attendance at a premiere of the movie; and on-set visitation during production of the movie.

12. The method of claim 1, further comprising:
receiving an indication of a payment of the dividend payment associated with the at least one of a date relative to consideration for an award for at least one of the first entertainment event and the second entertainment event and a date relative to a reduction to a number of venues in which at least one of the first entertainment event and the second entertainment event remains available.

13. The method of claim 12, in which the first entertainment event includes a primary source of revenue related to entertainment content and the second entertainment event includes a secondary source of revenue related to the entertainment content, and the payment includes a payment of a first dividend rate relative to the primary revenue source and a different dividend rate relative to the secondary revenue source.

14. The method of claim 13, in which the entertainment content includes a movie, the primary source of revenue includes ticket sales, and the secondary source of revenue includes at least one of video and DVD sales of the movie, television revenue for the movie, merchandising revenue for the movie, and licensing revenue for the movie.

15. The method of claim 1, further comprising:
receiving, by the processor of the machine, a selection of a derivative based on the first security for purchase; and
transmitting, by the machine, a request to purchase the derivative through the communication network to the remote device.

16. The method of claim 15, in which the derivative includes an agreement to make a payment if the first entertainment event earns a threshold amount of money by a threshold date.

17. The method of claim 15, in which the derivative includes an agreement to make a payment if the first entertainment event does not earn a threshold amount of money by a threshold date.

18. The method of claim 1, in which receiving the selection includes facilitating a negotiation regarding a rate of return and a purchase price of the securities bundle.

19. The method of claim 1, in which receiving the selection includes facilitating a negotiation regarding a rate of return associated with the at least one of a date relative to consideration for an award for at least one of the first entertainment event and the second entertainment event and a date relative to a reduction to a number of venues in which at least one of the first entertainment event and the second entertainment event remains available.

20. The method of claim 1, in which receiving the selection includes:
determining an expected revenue for the first security;
determining an expected revenue for the second security;
determining a rate of return for the securities bundle; and
determining a purchase price based on the expected revenues and rate of return.

21. The method of claim 1, in which receiving the selection includes:
determining an expected revenue for the first security;
determining an expected revenue for the second security;
determining a rate of return for dividends at the at least one of a date relative to consideration for an award for at least one of the first entertainment event and the second entertainment event and a date relative to a reduction to a number of venues in which at least one of the first entertainment event and the second entertainment event remains available; and
determining a purchase price based on the expected revenues and rate of return.

22. A system for purchasing a securities bundle, the system comprising:
a processor operable to execute a set of instructions stored on a memory; and
the memory, having stored thereon, the set of instruction, in which, when executed by the processor the set of instructions cause the processor to:
receive an indication of a securities bundle being offered for sale, in which the securities bundle comprises a first security and a second security, in which the first security is associated with a first entertainment event, in which the second security is associated with a second entertainment event;
receive an indication of a dividend schedule for the first and second entertainment events, in which the dividend schedule includes at least one of a date relative to consideration for an award for at least one of the first entertainment event and the second entertainment event and a date relative to a reduction to a number of venues in which at least one of the first entertainment event and the second entertainment event remains available;
receive a selection of the securities bundle for purchase; and
transmit a request to purchase the securities bundle to a remote device.

23. The system of claim 22, in which the indication identifies a return value on the securities bundle.

24. The system of claim 22, in which the indication identifies a purchase price on the securities bundle.

25. The system of claim 22, in which the securities bundle is associated with a payment of a dividend based on revenue associated with at least one of the first entertainment event and the second entertainment event between a closing date of the securities bundle and at least one date of the dividend schedule.

26. The system of claim 25, in which the first entertainment event comprises a movie and the payment is determined based on revenue at least partially based on domestic ticket sales of the movie.

27. The system of claim 25, in which the first entertainment event comprises a concert and the payment is determined based on revenue at least partially based on ticket sales of the concert.

28. The system of claim 25, in which the dividend schedule includes at least one second date and in which the securities bundle is associated with at least one second dividend payment associated with second revenue from at least one of the first and second entertainment event occurring between the at least one date and the at least one second date.

29. The system of claim 28, in which the second revenue is based on at least one of video sales; merchandising; licensing; and international ticket sales.

30. The system of claim 29, in which the dividend schedule identifies at least one payment associated with net profit of at least one entertainment company.

31. The system of claim 22, further comprising obtaining a non-financial dividend in conjunction with owning the securities bundle.

32. The system of claim 31, in which the first entertainment event is associated with a movie and the non-financial dividend comprises at least one of: a screening opportunity of the movie; preferred seating at a viewing of the movie; attendance at a premiere of the movie; and on-set visitation during production of the movie.

33. The system of claim 22, in which the set of instruction, when executed by the processor cause the processor to:
   receive an indication of a payment of the dividend payment associated with the at least one of a date relative to consideration for an award for at least one of the first entertainment event and the second entertainment event and a date relative to a reduction to a number of venues in which at least one of the first entertainment event and the second entertainment event remains available.

34. The system of claim 33, in which the first entertainment event includes a primary source of revenue related to entertainment content and the second entertainment event includes a secondary source of revenue related to the entertainment content, and the payment includes a payment of a first dividend rate relative to the primary revenue source and a different dividend rate relative to the secondary revenue source.

35. The system of claim 34, in which the entertainment content includes a movie, the primary source of revenue includes ticket sales, and the secondary source of revenue includes at least one of video and DVD sales of the movie, television revenue for the movie, merchandising revenue for the movie, and licensing revenue for the movie.

36. The system of claim 22, in which the set of instruction, when executed by the processor cause the processor to:
   receive a selection of a derivative based on the first security for purchase; and
   transmitting a request to purchase the derivative through the communication network to the remote device.

37. The system of claim 36, in which the derivative includes an agreement to make a payment if the first entertainment event earns a threshold amount of money by a threshold date.

38. The system of claim 36, in which the derivative includes an agreement to make a payment if the first entertainment event does not earn a threshold amount of money by a threshold date.

39. The system of claim 22, in which receiving the selection includes facilitating a negotiation regarding a rate of return and a purchase price of the securities bundle.

40. The system of claim 22, in which receiving the selection includes facilitating a negotiation regarding a rate of return associated with the at least one of a date relative to consideration for an award for at least one of the first entertainment event and the second entertainment event and a date relative to a reduction to a number of venues in which at least one of the first entertainment event and the second entertainment event remains available.

41. The system of claim 22, in which receiving the selection includes:
   determining an expected revenue for the first security;
   determining an expected revenue for the second security;
   determining a rate of return for the securities bundle; and
   determining a purchase price based on the expected revenues and rate of return.

42. The system of claim 22, in which receiving the selection includes:
   determining an expected revenue for the first security;
   determining an expected revenue for the second security;
   determining a rate of return for dividends at the at least one of a date relative to consideration for an award for at least one of the first entertainment event and the second entertainment event and a date relative to a reduction to a number of venues in which at least one of the first entertainment event and the second entertainment event remains available; and
   determining a purchase price based on the expected revenues and rate of return.

* * * * *